United States Patent
Li et al.

(10) Patent No.: US 11,162,643 B2
(45) Date of Patent: Nov. 2, 2021

(54) SINGLE-POINT DUAL SENSOR-BASED LEAKAGE POSITIONING METHOD AND SYSTEM FOR GAS-LIQUID STRATIFIED FLOW PIPELINE

(71) Applicant: CHINA UNIVERSITY OF PETROLEUM (EAST CHINA), Shandong (CN)

(72) Inventors: Yuxing Li, Qingdao (CN); Cuiwei Liu, Qingdao (CN); Lingya Meng, Qingdao (CN); Qihui Hu, Qingdao (CN); Hui Han, Qingdao (CN); Liping Fang, Qingdao (CN); Wuchang Wang, Qingdao (CN); Huafei Jing, Qingdao (CN); Yazhen Wang, Qingdao (CN); Jie Liang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 244 days.

(21) Appl. No.: 16/475,192

(22) PCT Filed: Dec. 11, 2017

(86) PCT No.: PCT/CN2017/115386
§ 371 (c)(1),
(2) Date: Jul. 1, 2019

(87) PCT Pub. No.: WO2019/090881
PCT Pub. Date: May 16, 2019

(65) Prior Publication Data
US 2019/0338889 A1 Nov. 7, 2019

(30) Foreign Application Priority Data
Nov. 13, 2017 (CN) .......................... 201711114217.5

(51) Int. Cl.
*F17D 5/06* (2006.01)
*G01M 3/24* (2006.01)

(52) U.S. Cl.
CPC ............... *F17D 5/06* (2013.01); *G01M 3/243* (2013.01)

(58) Field of Classification Search
CPC . F17D 5/06; G01M 3/00; G01M 3/24; G01M 3/243
See application file for complete search history.

(56) References Cited

U.S. PATENT DOCUMENTS

| 5,038,614 A | 8/1991 | Bseisu et al. |
| 10,634,536 B2 * | 4/2020 | Song .................. G01K 11/3206 |

(Continued)

FOREIGN PATENT DOCUMENTS

| CN | 101206010 A | 6/2008 |
| CN | 103672415 A | 3/2014 |

(Continued)

OTHER PUBLICATIONS

Aug. 16, 2018 Search Report issued in Chinese Patent Application No. PCT/CN2017/115386.

(Continued)

*Primary Examiner* — Nguyen Q. Ha
(74) *Attorney, Agent, or Firm* — Oliff PLC

(57) ABSTRACT

A single-point dual sensor-based leakage method and system for a gas-liquid stratified flow pipeline includes a single-point dual sensor-based leakage formula for a pipeline to be detected; installing two sensors at the same point of one end of the pipeline, a signal collected by the bottom sensor being an acoustic wave propagated by liquid in the pipeline, and a signal collected by the top sensor being an acoustic wave propagated by gas in the pipeline; processing the two acoustic waves to obtain a time difference; and substituting (Continued)

the acoustic velocity in a gas and the time difference into the single-point dual sensor-based leakage formula. The installation of sensors at two ends of a pipeline, avoids missing detection of leakage acoustic wave signals by a single sensor, reduces the number of installed sensors, and is low in cost, high in safety and strong in applicability to a gas-liquid stratified flow pipeline.

5 Claims, 2 Drawing Sheets

(56) References Cited

U.S. PATENT DOCUMENTS

| | | | |
|---|---|---|---|
| 2002/0149487 A1 | 10/2002 | Haines et al. | |
| 2018/0348035 A1* | 12/2018 | Huang | G01F 1/74 |
| 2020/0174149 A1* | 6/2020 | Thiruvenkatanathan | E21B 47/14 |
| 2020/0256834 A1* | 8/2020 | Langnes | E21B 47/10 |

FOREIGN PATENT DOCUMENTS

| | | | | |
|---|---|---|---|---|
| CN | 104132248 A | | 11/2014 | |
| CN | 104595729 A | | 5/2015 | |
| JP | S61-294326 A | | 12/1986 | |
| JP | 62055540 A | * | 3/1987 | G01M 3/24 |
| KR | 10-1525329 B1 | | 6/2015 | |

OTHER PUBLICATIONS

Aug. 16, 2018 Written Opinion issued in International Patent Application No. PCT/CN2017/115386.

\* cited by examiner

SINGLE-POINT DUAL SENSOR-BASED LEAKAGE POSITIONING METHOD AND SYSTEM FOR GAS-LIQUID STRATIFIED FLOW PIPELINE

FIELD OF THE INVENTION

The present invention belongs to the field of acoustic leakage monitoring technology for gas-liquid mixture delivery pipelines, and particularly relates to a single-point dual sensor-based leakage positioning method and system for a gas-liquid stratified flow pipeline.

BACKGROUND OF THE INVENTION

At present, there are many methods for positioning leakage of oil and gas pipelines. In these methods, the acoustic method has many advantages, and is the hotspot of current researches. The conventional acoustic method needs to install sensors at two ends of a pipeline, and then accurately positions leakage by solving the acoustic velocity and the time difference that the acoustic wave reaches the two ends of the pipeline. Most of the researches at home and abroad are based on the acoustic velocity and the positioning method of time difference between two sensors. If the sensors are installed at one end, the time difference cannot be calculated, or the time difference is very small, so that the positioning cannot be completed. Accordingly, single-point installation of sensors has been seldom researched.

According to investigation, the existing patents about oil and gas pipeline leakage positioning methods involving the acoustic method at home and abroad mainly include:

The prior art discloses a fluid pipeline leakage detection and positioning method, in which at least two sensing devices are arranged on a pipeline to be detected, the two sensing devices are spaced by a certain distance and can simultaneously sense acoustic vibration of the pipeline in two directions, and then leakage is positioned by solving the time differences of four signals in total of the two sensing devices in the two directions.

The prior art discloses an oil and gas pipeline leakage positioning method based on an acoustic amplitude, which uses a low-frequency acoustic amplitude obtained by wavelet analysis to perform leakage detection and positioning, establishes a propagation model of leakage acoustic waves in an oil and gas pipeline medium, and is a leakage positioning method without considering acoustic velocity and time difference.

The implementation of leakage positioning on the oil and gas pipeline disclosed in the above technologies is more dependent on the arrangement of sensors at two ends of the pipeline for monitoring a gas-liquid single-phase pipeline, specifically, sensors are arranged at two ends of a gas-liquid single-phase pipeline, and leakage acoustic signals are propagated to two ends of the pipeline, collected and processed for positioning.

In the above methods, the sensors are simultaneously installed at two ends of the pipeline to be detected, and the positioning for a leakage position of a gas-liquid stratified flow pipeline is not considered. At present, no relevant patents have been found for gas-liquid mixture delivery pipelines. When gas and liquid phases coexist inside a pipeline, the acoustic velocity is uncertain and positioning cannot be performed.

In addition, the simultaneous installation of sensors at two ends of the pipeline to be detected increases the density of arranged sampling points and increases the installation cost, which reduces the feasibility and applicability of promotion of the acoustic method.

In order to solve the above problems, a single-point dual sensor-based leakage positioning method is proposed for positioning leakage of a gas-liquid stratified flow pipeline, thereby reducing the investment, and increasing the feasibility of on-site application of the acoustic method.

SUMMARY OF THE INVENTION

An objective of the present invention is to provide a single-point dual sensor-based gas-liquid stratified flow pipeline leakage positioning method, which is intended to solve the problems that sensors must be installed at two ends of a pipeline at present and the conventional acoustic method is more used for single-phase pipelines, and increases the feasibility and applicability of the acoustic method.

In order to achieve the above objective, the present invention adopts the following technical solution:

A single-point dual sensor-based leakage positioning method for a gas-liquid stratified flow pipeline includes the following steps:

step 1: collecting an acoustic wave propagated by liquid and an acoustic wave propagated by gas at the same point of one end of a pipeline to be detected;

step 2: calculating a propagation time difference between the two acoustic waves; and step 3: positioning a leakage position of the pipeline to be detected according to the acoustic velocity of the collected acoustic wave propagated by the gas inside the pipeline to be detected in the gas medium, the acoustic velocity of the acoustic wave propagated by the liquid inside the pipeline to be detected in the liquid medium, and the propagation time difference between the two acoustic waves.

Further, in step 3, the method for positioning a leakage position of the pipeline to be detected is specifically:

$$x = \frac{c_1 c_2}{c_1 - c_2} \Delta t;$$

wherein $c_1$ is the acoustic velocity of the acoustic wave propagated in the gas medium, and $c_2$ is the acoustic velocity of the acoustic wave propagated in the liquid medium.

The present invention discloses a single-point dual sensor-based leakage positioning system for a gas-liquid stratified flow pipeline, comprising:

sensors installed at the same point of one end of a pipeline to be detected for collecting an acoustic wave propagated by liquid and an acoustic wave propagated by gas inside the pipeline to be detected;

an apparatus for calculating a propagation time difference between the two collected acoustic waves; and an apparatus for positioning a leakage position of the pipeline to be detected according to the acoustic velocity of the collected acoustic wave propagated by the gas inside the pipeline to be detected in the gas medium, the acoustic velocity of the acoustic wave propagated by the liquid inside the pipeline to be detected in the liquid medium, and the propagation time difference between the two acoustic waves.

Further, the sensor for collecting the acoustic wave propagated by the liquid inside the pipeline to be detected is installed at the bottom, and the sensor for collecting the acoustic wave propagated by the gas inside the pipeline to be detected is installed at the top.

Further, the apparatus for positioning a leakage position of the pipeline to be detected positions the leakage position of the pipeline to be detected according to the formula:

$$x = \frac{c_1 c_2}{c_1 - c_2} \Delta t;$$

wherein $c_1$ is the acoustic velocity of the acoustic wave propagated in the gas medium, and $c_2$ is the acoustic velocity of the acoustic wave propagated in the liquid medium.

Beneficial Effects of the Present Invention

The single-point dual sensor-based leakage positioning method for a gas-liquid stratified flow pipeline according to the present invention can position the leakage of the gas-liquid stratified flow pipeline through the established single-point dual sensor-based leakage positioning formula for the pipeline to be detected, thereby improving the feasibility and applicability of the acoustic method. The method of the present invention is simple and convenient to operate, and well solves the problems that sensors must be installed at two ends at present and the acoustic method is more used for gas-liquid single-phase pipelines.

DETAILED DESCRIPTION OF THE EMBODIMENTS

In order to make the objectives, technical solutions and advantages of the present invention clearer, the following further describes the present invention in detail in combination with embodiments. It should be understood that the specific embodiments described herein are only used for interpreting the present invention, rather than limiting the present invention.

The application principle of the present invention is further described below with reference to the accompanying drawings and specific embodiments.

Figure 1:
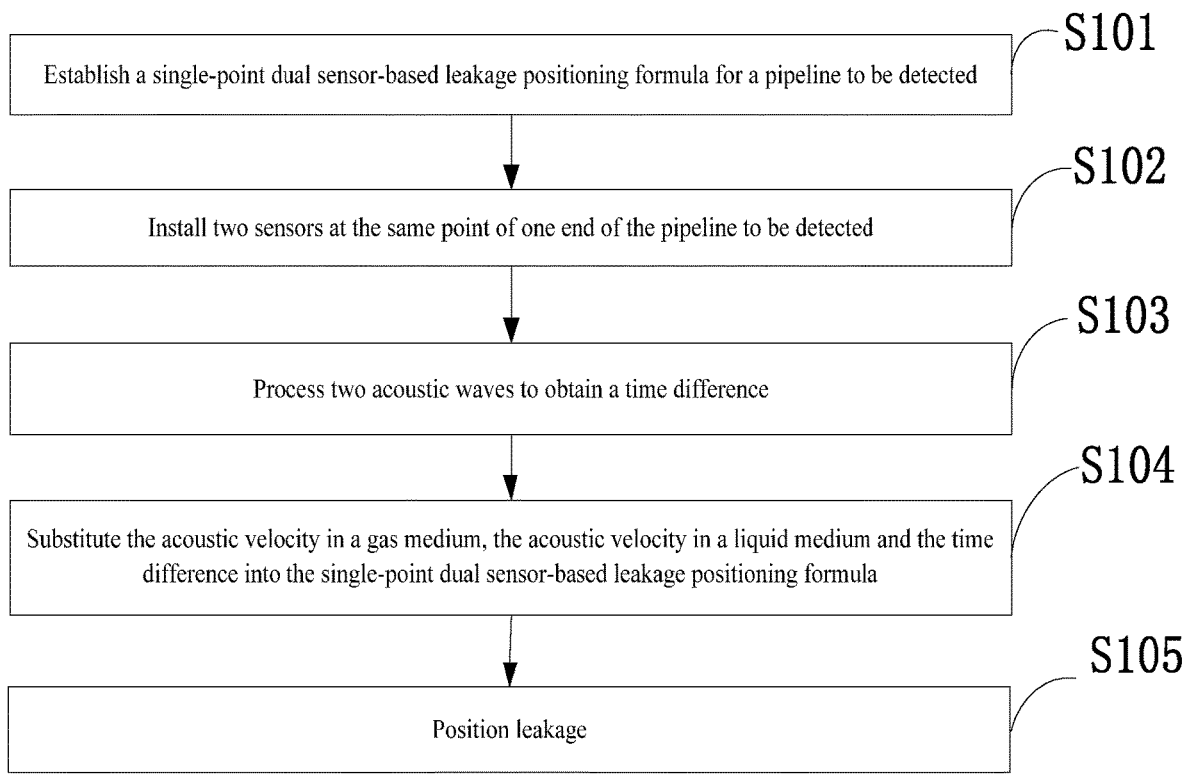
FIG. 1 is a flow diagram of a single-point dual sensor-based leakage positioning method for a gas-liquid stratified flow pipeline according to an embodiment of the present invention.

As shown in FIG. 1, a single-point dual sensor-based leakage positioning method for a gas-liquid stratified flow pipeline according to an embodiment of the present invention comprises the following steps:

S101: establishing a single-point dual sensor-based leakage positioning formula for a pipeline to be detected;

S102: installing two sensors at the same point of one end of the pipeline to be detected;

S103: processing two acoustic waves to obtain a time difference; and

S104: substituting the acoustic velocity in a gas medium, the acoustic velocity in a liquid medium and the time difference into the single-point dual sensor-based leakage positioning formula, and positioning leakage.

A single-point dual sensor-based leakage positioning system for a gas-liquid stratified flow pipeline according to the present invention includes:

sensors installed at the same point of one end of a pipeline to be detected for collecting an acoustic wave propagated by liquid and an acoustic wave propagated by gas inside the pipeline to be detected;

an apparatus for calculating a propagation time difference between the two collected acoustic waves; and an apparatus for positioning a leakage position of the pipeline to be detected according to the acoustic velocity of the collected acoustic wave propagated by the gas inside the pipeline to be detected in the gas medium, the acoustic velocity of the acoustic wave propagated by the liquid inside the pipeline to be detected in the liquid medium, and the propagation time difference between the two acoustic waves.

Figure 2:
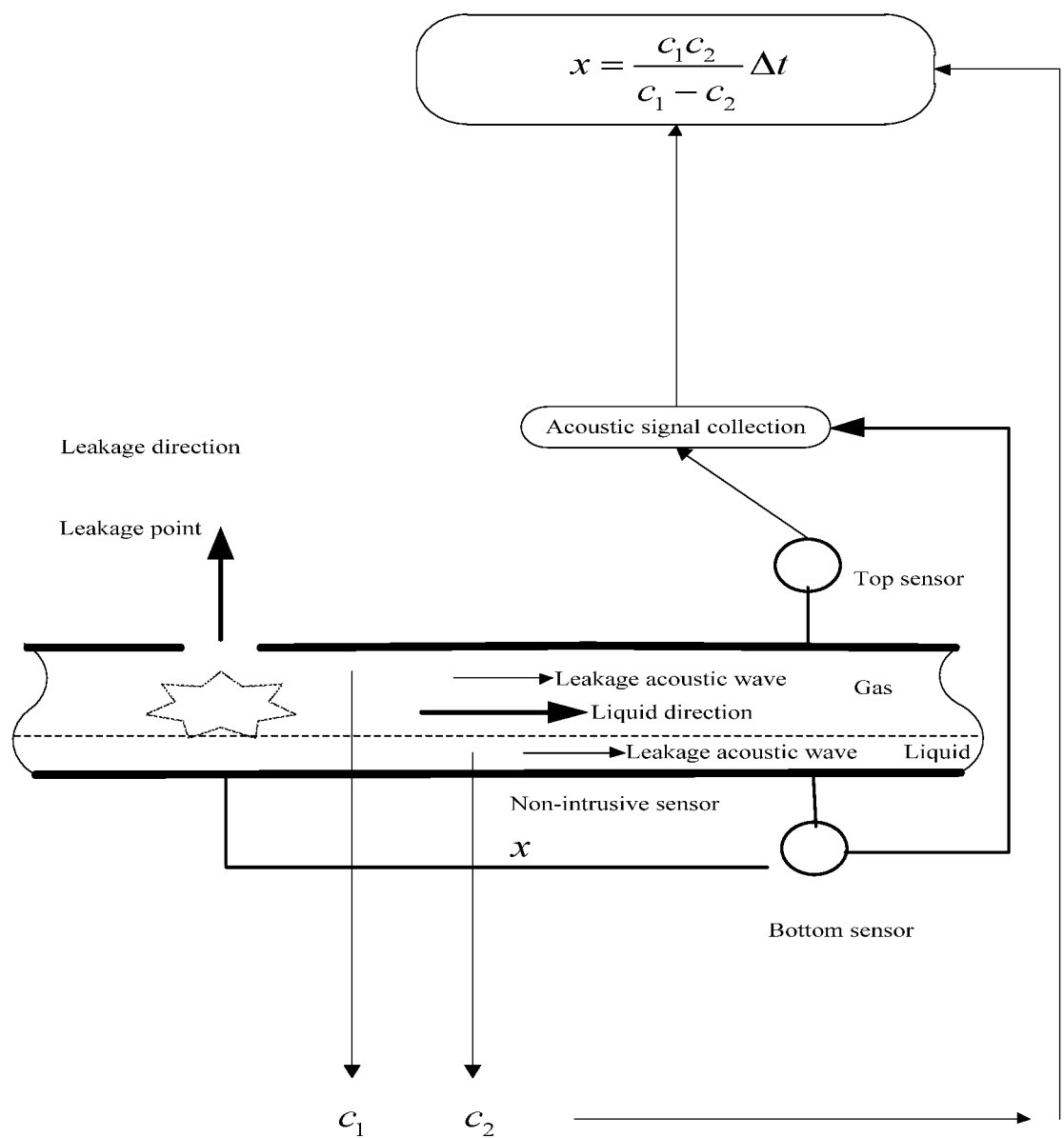
FIG. 2 is a principle diagram of the single-point dual sensor-based leakage positioning method for a gas-liquid stratified flow pipeline according to an embodiment of the present invention.

As shown in FIG. 2, the specific implementation process of the present invention is: a leakage point occurs at a certain point of a pipeline, two sensors are installed at the same point of the pipeline, one is installed at the top of the pipeline, the other one is installed at the bottom of the pipeline, the signal collected by the bottom sensor is an acoustic wave propagated by liquid in the pipeline, the signal collected by the top sensor is an acoustic wave propagated by gas in the pipeline, the acoustic velocity of the acoustic wave propagated in the gas medium is $c_1$, the acoustic velocity of the acoustic wave propagated in the iquid is $c_2$, the time difference between the two acoustic waves is $\Delta t$ , and then the position of the leakage point may be solved according to the leakage positioning formula:

$$x = \frac{c_1 c_2}{c_1 - c_2} \Delta t.$$

Although the specific embodiments of the present invention are described above in combination with the accompanying drawings, the protection scope of the present invention is not limited thereto. It should be understood by those skilled in the art that various modifications or variations could be made by those skilled in the art based on the technical solution of the present invention without any creative effort, and these modifications or variations shall fall into the protection scope of the present invention.

The invention claimed is:

1. A single-point dual sensor-based leakage positioning method for a gas-liquid stratified flow pipeline, comprising the following steps:
   step 1: respectively collecting with sensors, at a same longitudinal point of one end of the gas-liquid stratified flow pipeline to be monitored for leakage, an acoustic wave generated by a leakage and propagating in a liquid inside the pipeline, and an acoustic wave generated by the same leakage and propagating in a gas inside the pipeline;
   step 2: calculating a propagation time difference between the two collected acoustic waves; and
   step 3: determining a position of the leakage in the pipeline according to an acoustic velocity of the collected acoustic wave propagating in the gas, an acoustic velocity of the collected acoustic wave propagating in the liquid, and the propagation time difference between the two collected acoustic waves.

2. The single-point dual sensor-based leakage positioning method for a gas-liquid stratified flow pipeline according to claim 1, wherein in step 3, the step for determining the position of the leakage in the pipeline comprises calculating:

$$x = \frac{c_1 c_2}{c_1 - c_2} \Delta t;$$

wherein x is the determined position of the leakage in the pipeline from the sensors, $c_1$ is the acoustic velocity of the collected acoustic wave propagating in the gas, $c_2$ is the collected acoustic velocity of the acoustic wave propagating in the liquid, and $\Delta t$ is the propagation time difference between the two collected acoustic waves.

3. A single-point dual sensor-based leakage positioning system for a gas-liquid stratified flow pipeline, comprising:
   sensors installed at a same longitudinal point of one end of the gas-liquid stratified flow pipeline to be monitored for leakage, the sensors being configured to collect an acoustic wave generated by a leakage and propagating in a liquid inside the pipeline, and an acoustic wave generated by the same leakage and propagating in a gas inside the pipeline;
   an apparatus configured to calculate a propagation time difference between the two collected acoustic waves; and
   an apparatus configured to determine a position of the leakage in the pipeline according to an acoustic velocity of the collected acoustic wave propagating in the gas, an acoustic velocity of the collected acoustic wave propagating in the liquid, and the propagation time difference between the two collected acoustic waves.

4. The single-point dual sensor-based leakage positioning system for a gas-liquid stratified flow pipeline according to claim 3, wherein
   one of the sensors is configured to collect the acoustic wave propagating in the liquid and is installed at a bottom of the pipeline, and
   one of the sensors is configured to collect the acoustic wave propagating in by the gas and is installed at a top of the pipeline.

5. The single-point dual sensor-based leakage positioning system for a gas-liquid stratified flow pipeline according to claim 3, wherein the apparatus configured to determine the position of the leakage in the pipeline calculates the position of the leakage using the formula:

$$x = \frac{c_1 c_2}{c_1 - c_2} \Delta t;$$

wherein x is the determined position of the leakage in the pipeline from the sensors, $c_1$ is the acoustic velocity of the collected acoustic wave propagating in the gas, $c_2$ is the acoustic velocity of the collected acoustic wave propagating in the liquid, and $\Delta t$ is the propagation time difference between the two collected acoustic waves.

* * * * *